(12) United States Patent
Anwar

(10) Patent No.: US 7,905,465 B1
(45) Date of Patent: Mar. 15, 2011

(54) SHIMLESS ALIGNER

(75) Inventor: Abdul Gaffar Mohammad Anwar, Houston, TX (US)

(73) Assignee: Softway Industrial Solutions, LLC, Houston, TX (US)

( * ) Notice: Subject to any disclaimer, the term of this patent is extended or adjusted under 35 U.S.C. 154(b) by 35 days.

(21) Appl. No.: 12/466,298

(22) Filed: May 14, 2009

(51) Int. Cl.
*F16M 11/00* (2006.01)

(52) U.S. Cl. .................. 248/673; 248/188.2; 248/188.4; 248/346.05; 254/104

(58) Field of Classification Search .................. 248/673, 248/677, 678, 188, 188.1, 188.2, 188.4, 346.05; 254/104
See application file for complete search history.

(56) References Cited

U.S. PATENT DOCUMENTS

| | | | |
|---|---|---|---|
| 2,170,690 A | 8/1939 | Mafera | |
| 2,819,037 A * | 1/1958 | Wilkin | 254/104 |
| 3,306,562 A * | 2/1967 | Bellefleur | 248/188.2 |
| 3,849,857 A | 11/1974 | Murray, Jr. | |
| 4,114,845 A * | 9/1978 | Weisenberger | 248/615 |
| 4,436,268 A * | 3/1984 | Schriever | 248/188.3 |
| 4,858,865 A * | 8/1989 | Schrepfer | 248/188.2 |
| 5,427,349 A * | 6/1995 | Obrecht | 248/657 |
| 5,584,464 A * | 12/1996 | Whittaker | 248/678 |
| 6,116,565 A * | 9/2000 | Reinke et al. | 248/562 |
| 6,241,214 B1* | 6/2001 | Nisi et al. | 254/104 |
| H2009 H * | 1/2002 | Martin et al. | 248/677 |
| 6,505,806 B1* | 1/2003 | Glaesener | 248/638 |
| 6,889,946 B2* | 5/2005 | Bizaj | 248/188.2 |
| 7,328,879 B1* | 2/2008 | Plangetis | 248/679 |
| 2008/0029680 A1 | 2/2008 | Maxson | |

* cited by examiner

*Primary Examiner* — Terrell Mckinnon
*Assistant Examiner* — Bradley H Duckworth
(74) *Attorney, Agent, or Firm* — German Castillo Law Office, P.C.; German Castillo

(57) ABSTRACT

A shimless aligner for insertion between a machine foot and base to align the foot relative to the base, which foot and base are secured together by a hold-down bolt extending between the foot and base. The aligner includes, a top plate having a slanted bottom surface, a taper wedge having a slanted top surface slidably engaging the slanted bottom surface of the top plate and further having a vertical alignment rod extending substantially laterally, a bottom plate below the taper wedge, and a back plate attached substantially perpendicularly at one end of the bottom plate. For receiving the hold-down bolt, the top and bottom plates have a corresponding hole, while the taper wedge has a slot. Said back plate has a hole for the vertical alignment rod to slidably engage the hole thereby preventing rotation of the taper wedge during vertical alignment operations and preserving bent foot corrections.

16 Claims, 12 Drawing Sheets

SHIMLESS ALIGNER

RELATED APPLICATIONS

There are no previously filed, nor currently any co pending, applications anywhere in the world.

FEDERALLY SPONSORED RESEARCH

Not Applicable

PARTIES TO JOINT RESEARCH AGREEMENT

Not Applicable

SEQUENCE LISTING OR PROGRAM

Not Applicable

BACKGROUND OF THE INVENTION

1. Field of the Invention

The present invention relates generally to aligners, placed at the feet of equipment having rotating shafts in order that the axes of shaft rotation may be aligned, and more particularly to an improved aligner that is shimless (i.e., uses no shims), does not require the lifting of the equipment, and does not disturb the previous side alignment and lateral position of the equipment.

2. Description of the Related Art

Shaft alignment is a critical aspect of all mechanical systems utilizing equipment where rotational force is transferred from one piece of equipment to another via shafts that are fixedly coupled, whether by flanges, gears, or other forms of couplings. In a classic structure, one machine is acting as a driver transferring rotational energy to a second machine. The driver machine has a shaft and the driven machine has its own shaft. To efficiently transfer energy and minimize wear to the equipment, the two shafts must be coupled in such a manner that the respective centerlines of the two shafts are inline. In other words, the centerlines must overlap without horizontal offset, vertical offset, angular offset, or multiple offset.

Shaft horizontal offset occurs when the shaft centerlines are parallel on the same horizontal plane and thus require the equipment to simply receive horizontal shifting with respect to each other. Vertical offset occurs when the shaft centerlines are parallel on the same vertical plans and thus require the equipment to simply receive vertical shifting with respect to each other. Angular offset occurs when the shaft centerlines are at an angle to each other. Multiple offset occurs when equipment has components of angular and vertical and/or horizontal offset.

Misalignment of shafts and associated flanges, couplings, bearings, or gears causes noise and vibration, and thus accelerated wear. Misalignment will lead to frequent failures of couplings, bearings, or seals in the rotating machines. The long term effects of misalignment can be made apparent by the resulting binding, fluid leakage, powder, loose bolts, and cracks. These effects make misalignment a costly problem to all rotating shaft machines.

Many rotating shaft machine alignment problems can be traced to design, installation, or deterioration problems with the foundation, base or soleplate, or the machine casings/frames themselves. Thus not only will it be difficult to obtain accurate alignment initially, but it is going to be equally difficult to maintain proper alignment over long periods of time, if the machinery is sitting on unstable or improperly designed foundations and frames.

Even if the machines are satisfactorily designed and produced to minimize shaft alignment imperfections at initial installation, realignment must be repeated over time. Load conditions, heat generation during extensive hours of operation, environmental factors, floor expansions and contractions, and wear can alter the alignment of the shafts.

The shafts rotate on bearing and those bearings wear out and expand or contract according to operating environment conditions and heat generated during operation. While an experienced technician will know to compensate for such thermal growths during cold alignment checks (i.e., before the equipment is started), mistakes in calculations can occur and experience levels differ, thereby often leaving a need for adjustments once the equipment has gone into operation. Thus, the machinery shaft misalignment has to be measured by rotating the shafts of the machines to determine shaft straightness and compensate for the misalignment with reference to their bearings.

In a typical method of fixedly coupling shafts, each shaft has a coupling flange. The flanges are coupled by a coupling spool. Since the shafts rotate on bearings, the most common method of monitoring the misalignment of the shafts is to monitor the rim and face of each rotating flange with respect to the bearings. Technicians in the field have various methods for measuring the amount of misalignment using mechanical dial gauges and manual record keeping or by sophisticated computer equipment. But the important point is that once the amount of pertinent misalignment is known, the entire equipment is slightly repositioned by appropriate horizontal, vertical, and even rotational shifting.

To understand how the equipment is shifted or moved to effectuate shaft realignment, it is necessary to understand the typical means of securing equipment to the floor. It is a common industry practice to anchor bolts into the floor that will match up with the holes in the feet of the equipment. These bolts are referred to as hold-down bolts. When the feet are in position through the hold-down bolts and nuts are tightened over the feet and onto the bolts, the equipment is secure and unmoving even during the vibration of operation. It is at the machine feet and hold-down bolts that shaft misalignments are corrected by appropriate adjustments to the relative positions of the feet.

By merely loosening the retaining bolts, the equipment can be laterally and rotationally shifted on the horizontal plane. That is so because the holes are slightly oversized to allow for some movement of the feet with respect to the hold-down bolts rising from the floor.

However, vertical shifting of the equipment or movement of the feet up or down with respect to each other is a more complicated situation in the known art. The industry standard has been and remains to employ shims. Many devices have been proposed to effectuate vertical shifting of the individual machine feet, including jackscrews, portable hydraulic jacks, wedges, pry bars, cranes, hoists, and sledge hammers. However, precision deficiencies, excessive time required, and danger to machinery and personnel, are known as common disadvantages of such adjustment means. Attempts at improving over those means have been made but have failed in practice. For example, U.S. Pat. No. 3,849,857, issued in 1973 in the name of Murray, acknowledges the prior art limitations and discloses an alignment mechanism making use of a ball bearing table to facilitate vertical alignment without disturbing horizontal alignment.

But, that alignment mechanism like others has not found wide application in the industry, in part because they require significant customization and down-time to adept onto machines in the field. Additionally, many of these improved alignment mechanisms remain unacceptably bulky and therefore unworkable within the tight spaces in which many of these machines are located. Therefore, shims remain the most efficient known means of aligning the feet of machines, previous proposed designs in the art being impractical for cost, safety, or workability issues.

Thus, in the industry, one or more shims are placed under the bottom of each equipment foot until the necessary vertical equipment shifting has occurred to bring the shafts into alignment. In other words, correction of the vertical position of the machine feet is done by adding or subtracting shims of prefabricated thicknesses. There is an entire market of manufactures that sell prefabricated shims of varying shapes, thicknesses, and bolt accommodating slots. Depending on the type of machine feet and hold-down bolt size, appropriate shims are purchased and stacked below each foot of the equipment needing to be vertically shifted.

But there is at least one more important factor in pursuing satisfactory shaft alignment. Aside from having to obtain proper lateral or rotational shifting on the horizontal plane (accomplished by loosening the hold-down bolts and moving the machine) and having to obtain proper vertical shifting of the individual machine feet (commonly accomplished with the industry standard prefabricated shims), it is still necessary to account for phenomenon called "Soft Foot." A classic example of soft foot—like a bar table with one short leg—occurs when the machine naturally rests on three legs and the fourth leg is short. If not properly corrected before beginning the actual alignment, it may be difficult, even impossible, to achieve acceptable shaft alignment.

The technician may implement the exact machine movements/shifting as required by the alignment calculations the measuring equipment dictates, only to find that, because of soft foot problems, the machine frame distorts when hold-down bolts are tightened. As a result there will be little or no achieved improvement in shaft alignment.

Furthermore, even if soft foot problems do not completely prevent satisfactory horizontal and vertical shifting of the equipment to achieve the necessary shaft alignment, the frame distortion resulting from a soft foot can also lead directly to unnecessary vibration and premature component failure. In fact, soft foot has been observed to increase machine vibration levels by as much as ten times. In such cases, by not recognizing the contribution made by the soft foot, a technician may have tried to lower the vibration levels by better balancing, better alignment and so on, but yet obtained very little improvement. See, e.g., Buscarello, R. T., Practical Solutions to Machinery and Maintenance Vibration Problems, 99-105 (1979).

Soft foot is thus an issue that is integral to obtaining proper shaft alignment and even if shaft alignment is not needed, soft foot can also be destructive of the equipment if left uncorrected. There are different types of soft foot. In its simplest form, a foot can either be parallel or bent. It is relatively simple to locate and correct for a parallel foot. In the situation of parallel foot, the foot remains parallel to the supporting foundation but simply remains shorter than it should be. The current common industry practice would be to add the necessary stack of prefabricated shims under that foot.

It is substantially more complex to determine the profile of and correct for a phenomenon called "Bent Foot." In a bent foot situation the foot of the machine is either slightly bent up or down relative to the foundation. The bottom of the bent foot forms an angle to the foundation. The degree of bending is relative because the discrepancy between the foot and the foundation can be due to problems with the foot itself, the base-plate the foot sits on, and/or with the foundation. Furthermore, even if there are no design faults in the base-plate upon which the foots rests, the foundation, or the foot, a soft foot problem may still exist in the form of induced soft foot (also called piping strain) because external forces, like pipe and conduit stress, coupling misalignment, etc., cause the foot to move away from the base.

Regardless of what causes the bent foot situation, it must be corrected. Unlike the simpler parallel foot problem, where the industry standard is to use a stack of prefabricated shims of uniform thickness to correct the problem, bent foot can not be resolved that easily. Instead it will be necessary to measure the size and the shape of the gap between the foot and the foundation. Because the foot is at an angle relative to the supporting foundation, a uniform thickness shim will be unable to solve bent foot. Instead, in the case of a bent foot, the technician will need to create a custom "taper shim" to completely fill the gap. Basically, gap measurements need to be taken at all sides of the foot to custom build a shim with thicknesses at each side to match the gaps. In effect the "taper shim" when placed under the bent foot will create a new lower surface that is perfectly parallel and in complete contact with the foundation base. In most instances the "taper shim" will a tapered structure to complement the bent foot angle.

This state of the art in machine alignment, with all its known problems, leads up to the present invention. To date, placement of appropriate shim packs under the individual feet of the machine remains the industry standard for shifting the machine to achieve appropriate shaft alignment. This process requires shut down of the equipment to loosen their hold-down bolts, and then raising the equipment by mechanical or hydraulic means to enable removing or adding the required shims. This process of vertical shifting disturbs the equipment side alignment and distance between machine to machine shaft couplings, which results in additional equipment downtime and production and man-hour losses.

In heavy industrial applications the cost of downtown can exceed $10,000 per hour, so the tedious and time consuming process of adding and subtracting shims can be quite costly. Also, additional equipment is generally necessary to assist in shifting the machine while shims are added or subtracted. Therefore, shims to accomplish alignment of the machine shafts have left an unresolved need for a more efficient mechanism.

While wedges, jackscrews, hydraulic jacks, cranes, hoists, and even more brute means like sledge hammers are known to be able to achieve some level of vertical and horizontal machine shifting at the feet, none have been able to present a solution that efficiently, safely, and cost effectively achieves shaft alignment even while simultaneously accommodating the "taper shims" necessary to correct for bent foot.

For example, U.S. Pat. No. 2,170,690, issued in the name of Mafera, discloses the use of wedges as a means of accomplishing vertical shifting of individual machine feet. In that disclosure, two wedge members are basically allowed to slide against each other on their hypotenuse side. The bottoms of the wedge members are to remain parallel to each other throughout the sliding motion and accomplish vertical shifting of the machine, given that the co-acting wedge members are placed in between the machine and the foundation. However, that wedge invention also teaches that the wedges should have aligned slots and that the wedges should attach to an aligner base that has a countersunk slot. In this manner the invention allows the hold-down bolt freedom to slide along the countersunk slot and thereby allows the machine to shift horizontally. In that patent, it is expressly taught that these design features of leaving the wedge members free to rotate is a critical component of the aligner mechanism. As will be explained, such approach solves some problems but creates new more critical complications.

In particular, such prior art wedge designs are deficient because it leaves unresolved the problem of bent foot. For if a "taper shim" has been placed under the machine at a particular bent foot, and later such prior art wedge mechanism is added, the fact that the wedges are free to rotate will effectively defeated the purpose of the taper shim. In other words, a machine foot forms a unique gap shape relative to the foundation. The taper shim is supposed to match that gap perfectly and any rotational movement of the taper shim, due to the rotational freedom of the wedges, defeated the goal of matching the gap.

The wedge designs like those in U.S. Pat. No. 2,170,690 are also deficient because in giving the hold-down bolt freedom to slide along a counter sunk slot in the aligner mechanism base, efficiency in placement of the aligner mechanism is lost. Implementation of that wedge-based aligner mechanism in the field means that additional hold-down bolts have to be adapted (i.e., drilled) into the foundation. Furthermore, because in the field there is often limited access or hot-work restriction, it is often difficult to add such prior art aligner mechanism designs to the machines already in operation in the field. Thus, the known wedge designs are difficult to install in the field.

On a commercial level, the inventors know of no aligner mechanism that is in actual production and use. So while some patent applications on the subject may exist, the only commercially implemented method of alignment at present remains the use of shims—creating an entire market of precut shims manufactured in a variety of sizes. It is a likely reflection of the non-viability of prior art aligners that has left manufactured precut shims the industry standard for accomplishing equipment alignment.

Therefore, there remains an unresolved need for an aligner mechanism that can replace the industry standard prefabricated shims, replace the need for external lifting mechanisms, can be efficiently and safely added unto machines already in the field, safely allows for alignment without having to shutdown the machines, accomplishes vertical alignment of the feet without disturbing horizontal alignment, and accomplish vertical and horizontal alignment without disturbing existing "taper shims" that are under the feet to correct bent foot.

BRIEF SUMMARY OF THE INVENTION

Therefore, it is the object of the present invention to provide a state of the art aligner mechanism that replaces the prefabricated shim packets and resolves all these long felt unresolved needs. In particular, it is an object of the present invention to be cost effective to add onto pre-existing equipment in the field, to allow for routine alignment of the machine with minimal downtime, and to also accommodate so called "step-shims" for the correction of bent foot.

It is a feature of the present invention that it functions in substitution of a pack of prefabricated shims, within its designed range. No adding or subtracting of shims is required and no separate equipment is required to lift the machine. This saves considerable maintenance time and production losses. The present invention is typically embodied with a size that accommodates the equipment foot hold-down bolt and matches standard shim sizes.

Briefly described according to one embodiment of the present invention, the shimless aligner can be used in place of the conventional method of adding or subtracting shims to correct the soft foot/misalignment of the equipment. Instead of adding shims to vertically move the feet, an alignment screw is turned and a graduated ring marks off the vertical movement. A wedge component in the present invention accomplishes the vertical lift on the machine foot, since the alignment screw causes the wedge component to slide relative to the machine foot. The preexisting hold-down bolts in the machine feet are utilized without the need for additional hold-down bolts or additional complicated attaching mechanisms. Thereby, the present invention can be efficiently added onto the machines in the field and minimize costs of initial alignment and periodic re-alignment.

Because the present invention has a lifting mechanism integral with the alignment means, it is unnecessary to shutdown the machines while shaft realignment is sought. And, because the present invention does not disturb the "step-shims" that correct bent foot, vertical shifting of the feet will not waste resources having to reposition the "step-shims."

Because the present invention utilizes wedges that are not free to rotate around the hold-down shaft, any preexisting "step-shims" (that correct bent foot) will be undisturbed as horizontal and vertical shifting is accomplished using the present invention. By not disturbing the step-shims it will be unnecessary to waste resources repositioning the "step-shims." Furthermore, because the present invention utilizes a top plate that remains fixed with respect to rotational and horizontal shifting (i.e., free to move only vertically up or down along the hold-down bolt), the horizontal alignment will remain undisturbed by the vertical shifting of the equipment as the adjustment screw is turned.

Finally, in a best mode of the present invention, a built in side alignment screw will be able to facilitate part of the horizontal shifting of the equipment. That screw will shift the machine at the respective equipment base corner by applying lateral force to that equipment base corner. No additional attachments are required. The side alignment screw will work within the confinements of the shimless aligner.

Because of the relative compact size of the present invention, it will be susceptible of installation onto equipment already in service or supplied with the manufactured equipment, creating the possibility that the present invention will become a machinery standard.

BRIEF DESCRIPTION OF THE DRAWINGS

The advantages, features, and preferred embodiments of the present invention are better understood with reference to the following more detailed description and claims when taken in conjunction with the accompanying drawings, in which like elements are identified with like symbols, and in which:

DETAILED DESCRIPTION OF THE INVENTION

While this invention is susceptible of being embodied in many different forms, preferred embodiments of the invention are shown and described in detail below with the understanding that disclosure merely exemplifies the principles of the invention and is not intended to limit the invention to the embodiments illustrated.

The best mode for carrying out the invention is presented in terms of its preferred embodiment, as depicted within FIGS. 4-10 and FIGS. 12-23.

Figure 1:
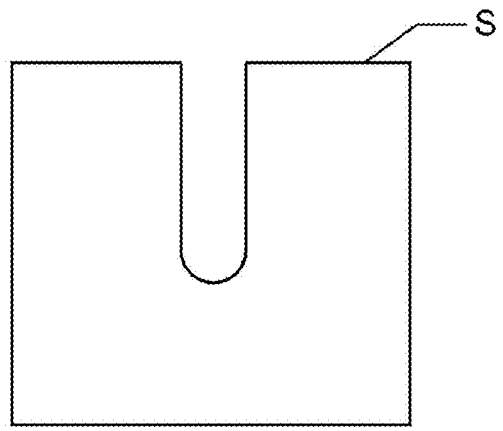
FIG. 1 is a top view of a prior art shim, demonstrating a general square perimeter and slot to accommodate the hold-down bolt.
Figure 2:
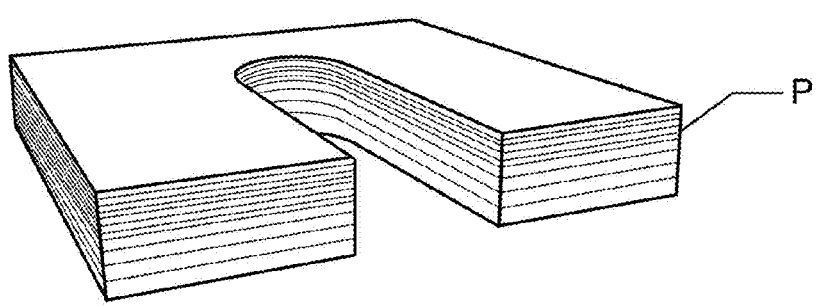
FIG. 2 is a perspective view of a prior art shim pack, composed of several prefabricated shims of various thicknesses.
Figure 3:
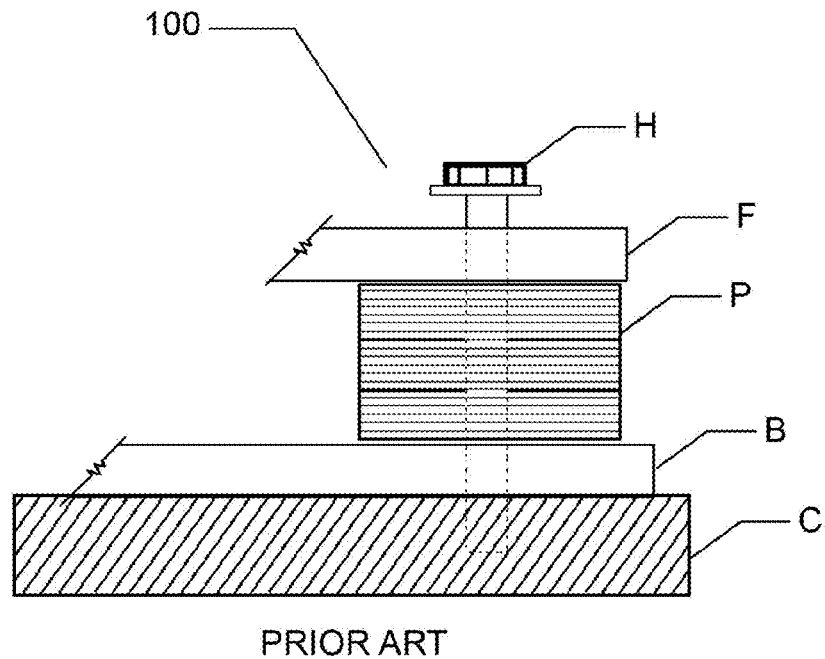
FIG. 3 is a side view of the prior art shim pack in operational placement between the equipment foot and the equipment base, all held together by a hold-down bolt anchored to the foundation—the equipment foot, the equipment foundation base, and the cement foundation are shown in cross-section.

Referring to FIGS. 4-10 and FIGS. 12-23, a shimless aligner 100 is shown in accordance with the preferred embodiment of the present invention. To better understand how the shimless aligner 100 efficiently replaces prior art shims, several figures demonstrate aspects of the prior art. FIG. 1 demonstrates a typical prior art shim "S" from a top view, demonstrating its general square nature and a standard size slot for accommodating the equipment hold-down bolts. FIG. 2 demonstrates a typical prior art shim pack "P", in other words a stack of several shims, which together obtain a necessary total thickness. FIG. 3 demonstrates a typical placement of a prior art shim pack "P" in between the equipment foot "F" and the equipment foundation base "B." The entire arrangement is held together with a hold-down bolt "H" that anchors onto the cement foundation "C."

A best mode of the present invention replaces the shim pack "P" with minimal modifications to the field equipment and hold-down components and with out taking much additional space. That fact is apparent by comparing the prior art in FIG. 3 with the shimless aligner 100 in FIG. 4, where its placement in demonstrated. The shimless aligner 100, like the prior art pack of shims "P," is located between the equipment foot "F" and the equipment foundation base "B," which sits on the cement foundation "C." Like the prior art shim pack "P," the shimless aligner 100 is held in position by hold-down bolt "H." However, instead of having to use alternate means like hoists or jacks to lift the machine to be aligned and then adding or subtracting shims, the shimless aligner 100 can lift the machine and hold the necessary position on its own.

Figure 4:
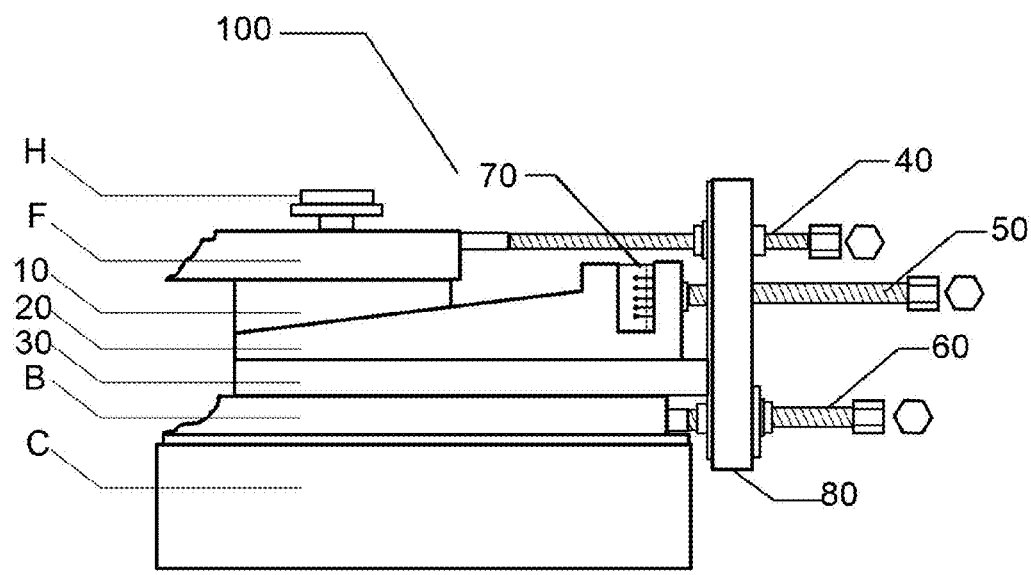
FIG. 4 is a side view of the shimless aligner in operational placement between the equipment foot and the equipment base, all held together by a hold-down bolt anchored to the foundation—the equipment foot, the equipment foundation base, and the cement foundation are shown in cross-section.

As demonstrated in FIG. 4, the shimless aligner 100 consists of a top plate 10, a taper wedge 20, a bottom plate 30, a side alignment screw 40, a vertical alignment screw 50, a locking screw 60, a graduated ring 70, and a back plate 80. The top plate 10 and the bottom plate 30 are fixed with respect to movement in the horizontal plane, even when the equipment hold-down bolt is loosened. Such limited movement occurs because the top plate 10 and the bottom plate 30 do not use slots, but rather use singular holes that match the equipment hold-down bolt diameter.

In a best mode, the bottom plate 30 is welded to the back plate 80, so that when the locking screw 60 is tightened against the equipment foundation base, the entire shimless aligner 100 will not rotate around the equipment hold-down bolt—even if the equipment hold-down bolt "H" is loosened to do vertical shifting of the equipment.

With the equipment hold-down bolt "H" loosened, it is possible to turn the vertical alignment screw 50 in increments demarcated by the graduated ring 70. When the desired vertical shifting of the equipment is accomplished on the equipment foot "F," the equipment hold-down bolt "H" is tightened and operation of the equipment can continue.

If the equipment foot "F" needs to move horizontally away from the back plate 80, the horizontal adjustment screw 40 can be turned to accomplish the necessary horizontal shifting of the equipment. As can be seen, minimal invasion of the existing equipment structure and foundation "C" is required. The shimless aligner 100 utilizes the existing hold-down bolt "H" and corresponding anchor holes in the cement foundation "C." The shimless aligner 100 requires no extra drilling or other custom adaptations to hold itself onto the equipment "F" or foundation "C."

Figure 5:
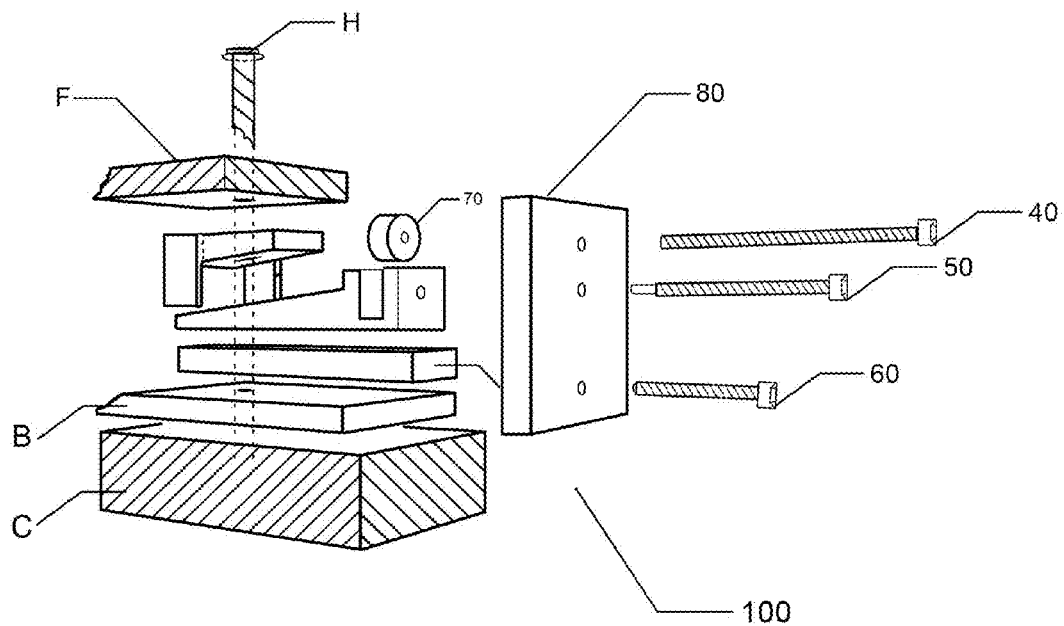
FIG. 5 is an exploded view of the shimless aligner with a perspective from the back.

To better appreciate the interaction of all the components, FIG. 5 demonstrates an exploded view of the shimless aligner 100. The equipment foot "F", equipment foundation base "B", the concrete foundation C, and the hold-down bolt "H" are shown with hidden lines to emphasize that they are part of the preexisting environment and not part of the invention. The top plate 10 will be flush against the equipment foot "F" and be held in place by the hold-down bolt "H." The taper wedge 20 will slide along the bottom of the top plate 10 and along the top of the bottom plate 30. Because the taper wedge 20 has a slot instead of a hole, it will be able to slide around hold down bolt "H."

Continuing with FIG. 5, side alignment screw 40 is threaded trough the first hole in back plate 80, until it rests against equipment foot "F." Vertical alignment screw 50 is threaded through back plate 80, through the taper wedge 20 and through the graduated ring 70. Locking screw 60 is threaded through the last bottom hole in back plate 80, until it rests against the equipment foundation base "B." By tightening the locking screw 60 in this manner, the shimless aligner 100 will not rotate even when the hold-down bolt "H" is loosened, thereby minimizing horizontal alignment disturbances during vertical alignment adjustments. Finally, bottom plate 30 is permanently affixed to back plate 80, via welding or similar means.

Figure 6:
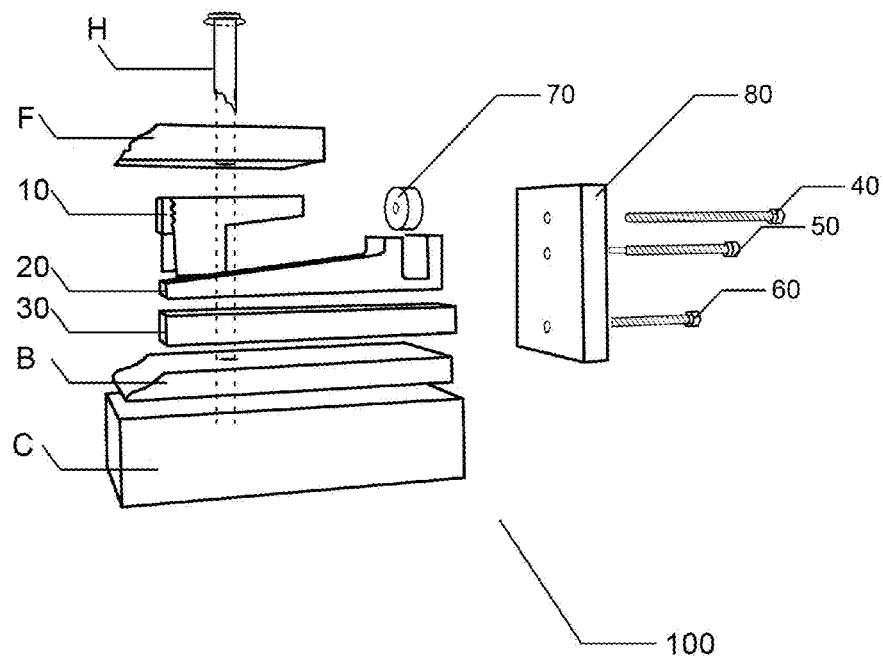
FIG. 6 is an exploded view of the shimless aligner with a perspective from the front.

To gain better vantage points of view, FIG. 6 demonstrates an exploded view of the shimless aligner 100, but from an opposite perspective. All elements in FIG. 6 are identical to the elements in FIG. 5, but are viewed from the front, instead of from the back.

Figure 7:
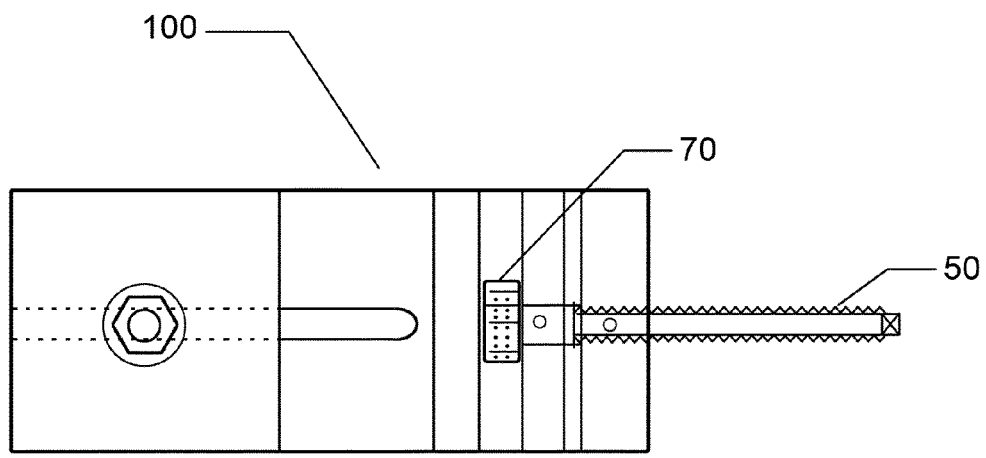
FIG. 7 is a top view of the shimless aligner.

In FIG. 7, the shimless aligner 100 is demonstrated from the top view. The graduated ring 70 is clearly visible and is there to facilitate measurement of vertical alignment as the vertical alignment screw 50 is turned.

Figure 8:
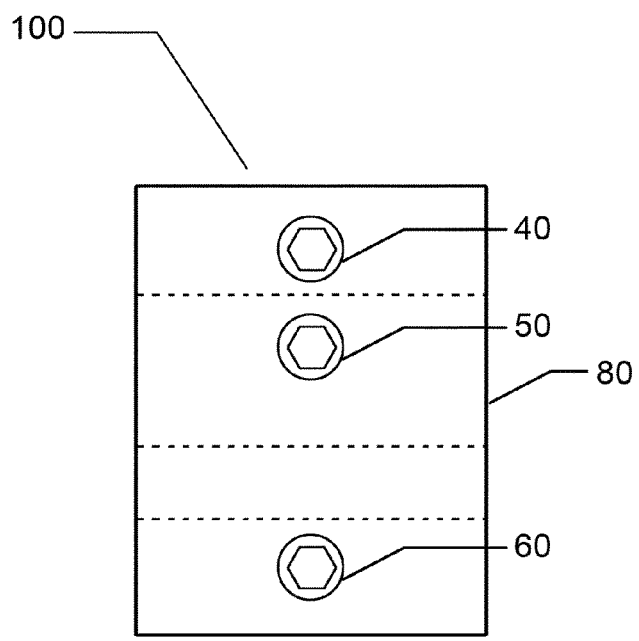
FIG. 8 is a back view of the shimless aligner.

In FIG. 8, the shimless aligner 100 is demonstrated from the back view. The horizontal alignment screw 40, the vertical alignment screw 50, and the locking screw 60 are all equally and easily accessible at the back plate 80.

Figure 9:
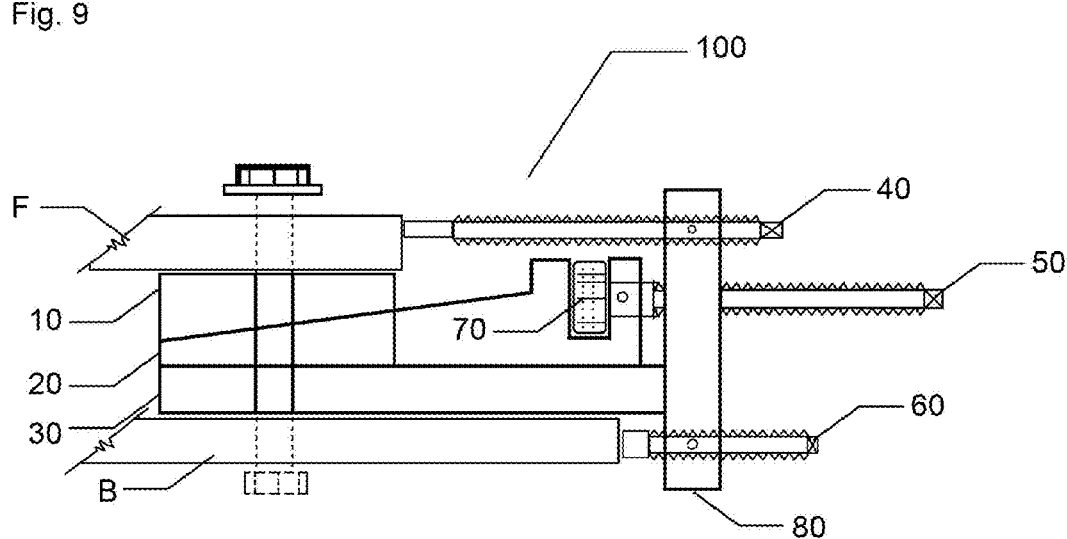
FIG. 9 is a side view of the shimless aligner where the taper wedge element is fully retracted against the back plate.
Figure 10:
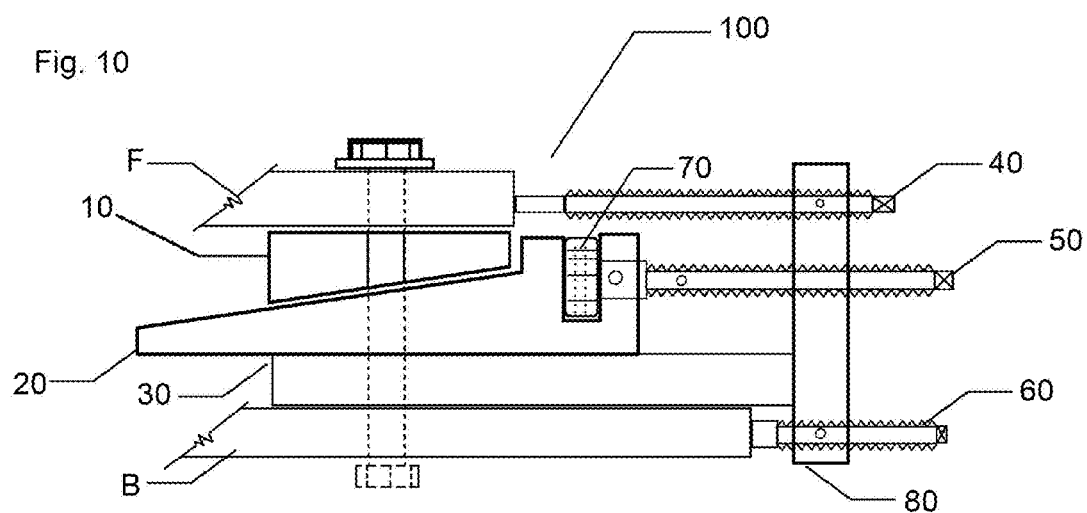
FIG. 10 is a side view of the shimless aligner where the taper wedge element has traveled away from the back plate thereby increasing the vertical space between the equipment foot and the foundation.

In FIG. 9, the shimless aligner 100 is demonstrated from a side view. The taper wedge 20 is fully retracted against the back plate 80. Comparing FIG. 9 against FIG. 10 demonstrates how vertical movement of the equipment foot "F" occurs. In FIG. 10, the same shimless aligner 100 is demonstrated with the taper wedge 20 fully extended. The distance between the equipment foot "F" and the equipment foundation base "B" is greater in FIG. 10 than in FIG. 9, due to the movement of the taper wedge 20.

Figure 11:
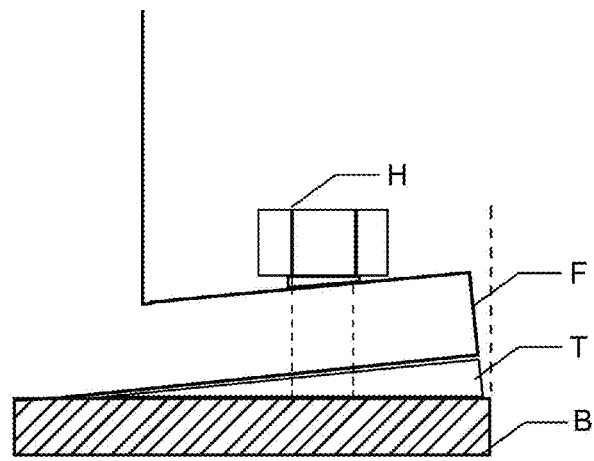
FIG. 11 is a side view of a prior art taper shim, custom shaped to fit between the bent foot and the foundation.
Figure 12:
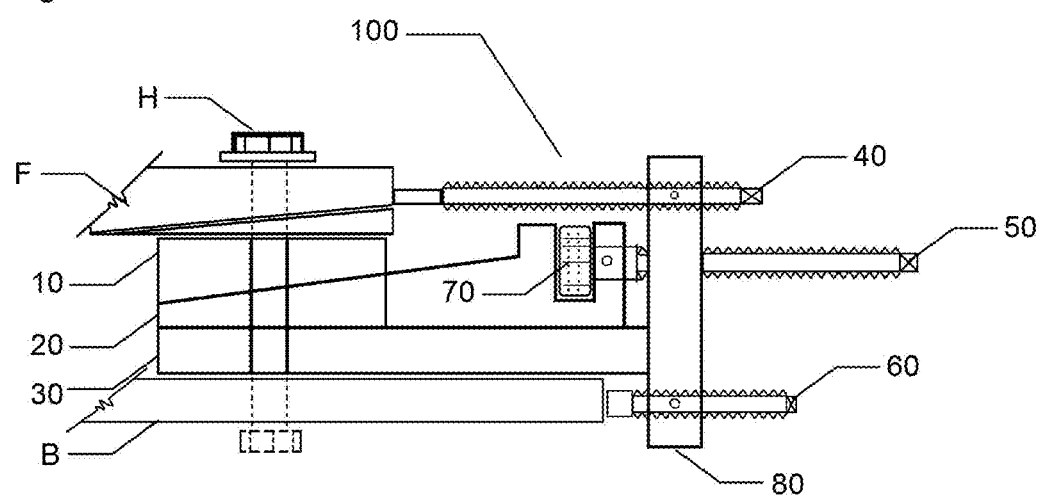
FIG. 12 is a side view of the shimless aligner cooperating with a taper shim.

One critical object of the present invention is better understood with reference to FIG. 11, which is a side view of a prior art taper shim "T", custom shaped to fit between the bent foot "F" and the foundation "B." Some previous attempts at using wedges to accomplish equipment alignment have failed because they do not take into consideration bent foot situations. However, the shimless aligner 100 is depicted in FIG. 12 in cooperation with a taper shim "P." The top plate 10 will not rotate or otherwise move in the horizontal plane even when the hold-down bolt "H" is loosened. As such, any taper shim "T" that was placed under the equipment foot "F" to compensate for the bent foot problems will be undisturbed during loosening of the hold-down bolt "H." Unlike some prior art wedge designs, the top plate 10 is fixed on the horizontal plane with respect to the equipment foot "F." Even as the top plate moves up or down along the hold-down bolt "H," its fixed horizontal placement relative to the equipment foot "F" will remain the same, allowing the taper shim "T" to remain in place. In short, FIG. 12 demonstrates that the shimless aligner 100 will efficiently cooperate with taper shims "P."

Figure 13:
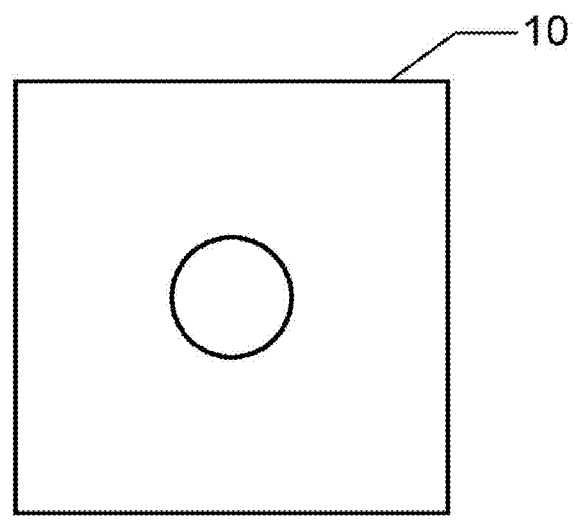
FIG. 13 is a top view of the top plate component of the shimless aligner.

FIG. 13 is a top view of the top plate 10 of the shimless aligner 100 and is meant to emphasize that the top plate 10 will use a hole instead of any slots. Again, that is a critical difference with prior art approaches to using wedges as an alignment mechanism. The use of a hole instead of a slot is a feature that keeps the top plate 10 in fixed horizontal placement relative to the equipment foot "F."

Figure 14:
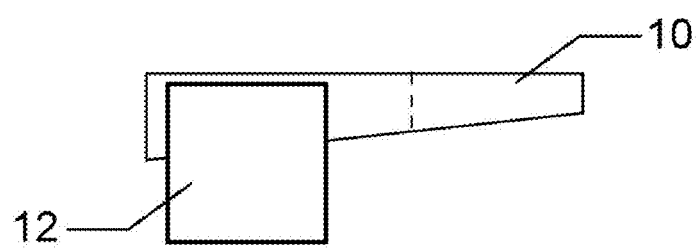
FIG. 14 is a side view of the top plate component of the shimless aligner, where a stabilizer bar element is more clearly visible.

FIG. 14 is a side view of the top plate 10 of the shimless aligner 100, where a stabilizer bar element is more clearly visible. The stabilizer bar that appears in the side view further assists in keeping the top plate 10 in fixed horizontal placement relative to the equipment foot "F." The stabilizer bar element is integral with the top plate 10 and can be molded as one piece or welded to form one piece. It will be understood that a stabilizer bar element is integral to each left and right side of the top plate 10.

Figure 15:
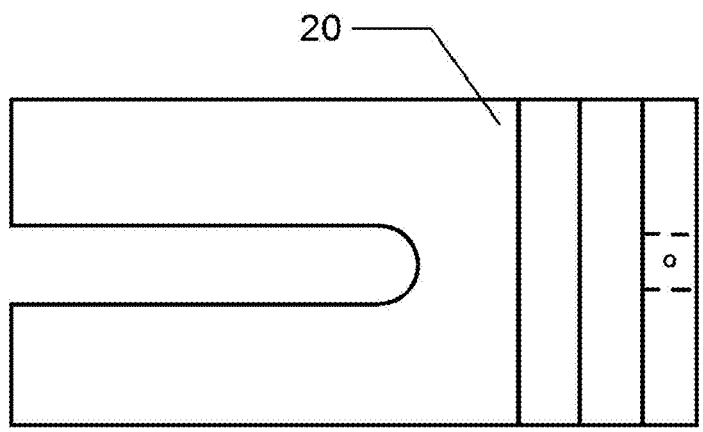
FIG. 15 is a top view of the tapered wedge component of the shimless aligner.

FIG. 15 is a top view of the tapered wedge 20 of the shimless aligner 100. This figure emphasizes that the tapered wedge 20 will have a slot to slide around the hold-down bolt "H."

Figure 16:
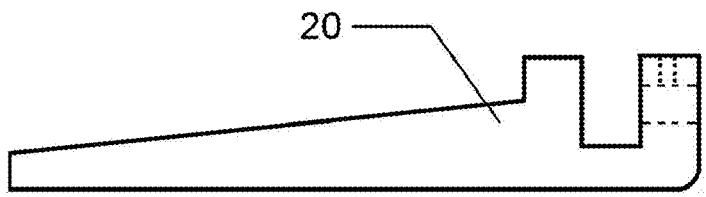
FIG. 16 is a side view of the tapered wedge component of the shimless aligner.

FIG. 16 is a side view of the tapered wedge 20 of the shimless aligner 100. This figure emphasizes that tapered wedge 20 will have a slot to accommodate a graduated ring 70.

Figure 17:
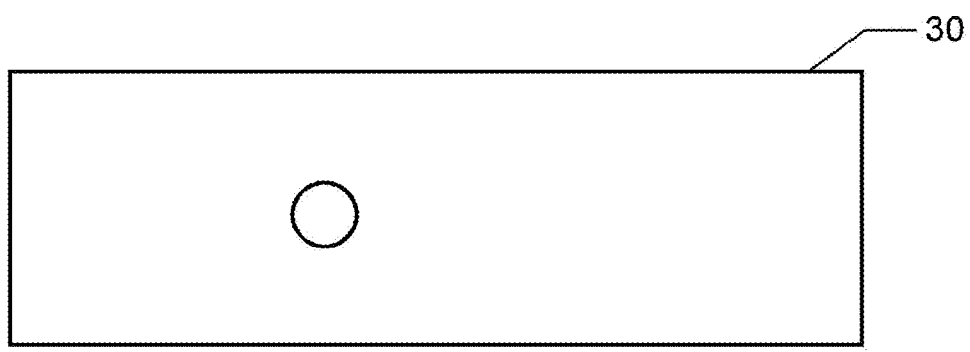
FIG. 17 is a top view of the bottom plate component of the shimless aligner.

FIG. 17 is a top view of the bottom plate 30 of the shimless aligner 100. This figure emphasizes that the bottom plate 30 will have a hole, and not a slot, for cooperating with the hold-down bolt "H". Like the top plate, the bottom plate will remain horizontally fixed with respect to its adjacent environment, here the equipment foundation base "B."

Figure 18:
FIG. 18 is a side view of the bottom plate component of the shimless aligner.

FIG. 18 is a side view of the bottom plate 30 of the shimless aligner 100. This figure emphasizes that the bottom plate 30 will be of uniform thickness, unlike the taper wedge 20 or the tope plate 10.

Figure 19:
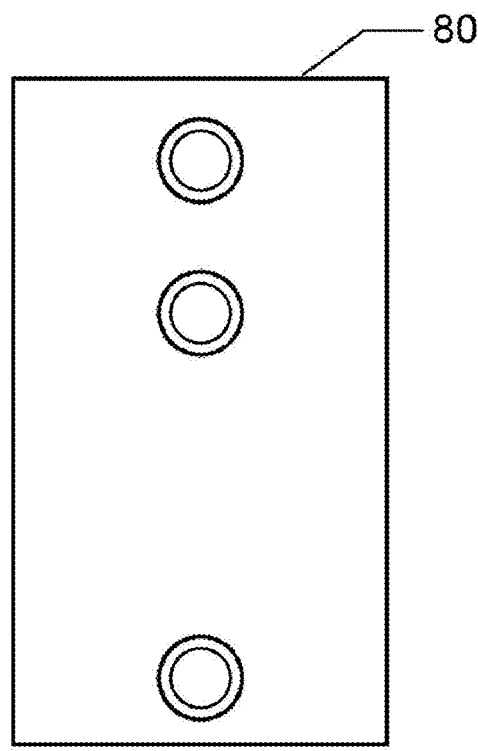
FIG. 19 is a back view of the back plate component of the shimless aligner.

FIG. 19 is a back view of the back plate 80 of the shimless aligner 100. This figure demonstrates a best mode for arranging the placement of the screw holes. Through those holes, the side alignment screw 40, the vertical alignment screw 50, and the locking screw 60 will be threaded, respectively top to bottom.

Figure 20:
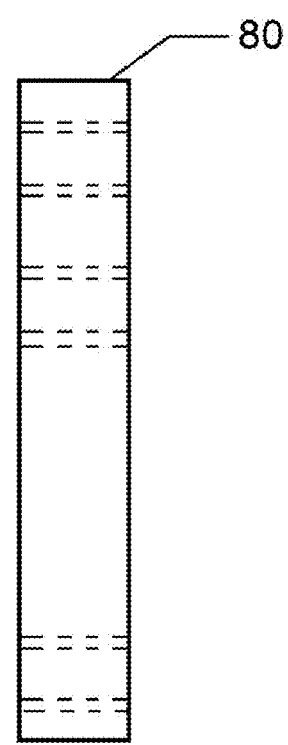
FIG. 20 is a side view of the back plate component of the shimless aligner.

FIG. 20 is a side view of the back plate 80 of the shimless aligner 100. This figure emphasizes that the holes should proceed in parallel placement and perpendicular to the face of the back plate.

Figure 21:
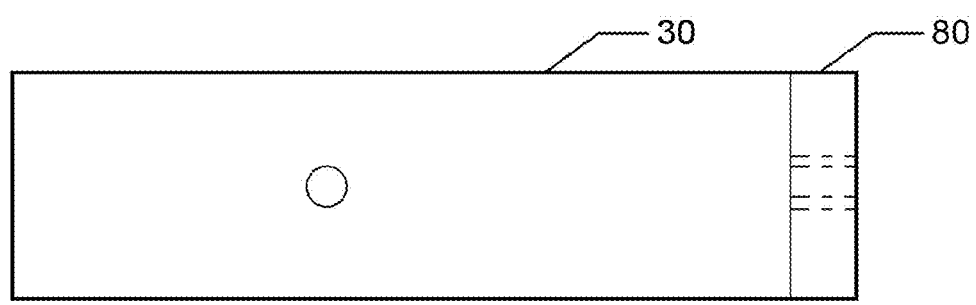
FIG. 21 is a top view of the assembled bottom plate and back plate components of the shimless aligner.
Figure 22:
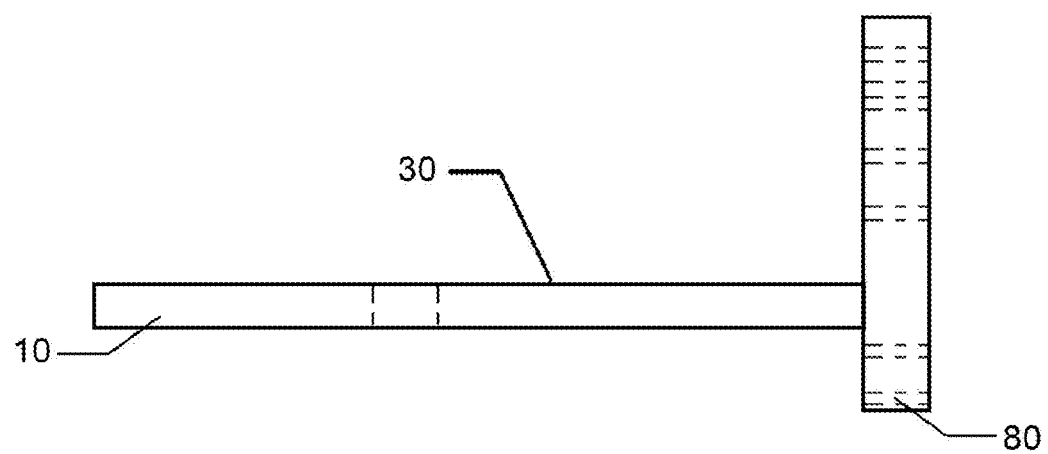
FIG. 22 is a side view of the assembled bottom plate and back plate components of the shimless aligner.

FIG. 21 is a top view of the bottom plate 30 and back plate 80 assembled into necessary cooperation for use in the shimless aligner 100. The back plate 80 lies at the end of the bottom plate 30. FIG. 22 is side view of the same assembly and provides additional understanding of how the bottom plate 30 and back plate 80 should be connected. In a best mode, the bottom plate 30 and the back plate 80 will be permanently attached as shown by welding the joints. Typically, by the time the shimless aligner 100 is brought to the field, the bottom plate 30 and the back plate 80 will have already been welded as part of the manufacturing process of the shimless aligner.

Although the preferred embodiment utilizes the side alignment screw 40, the vertical alignment screw 50, and the locking screw 60 to achieve stable vertical and horizontal alignment, such alignment could also be accomplished using other mechanisms, such as a rods.

Figure 23:
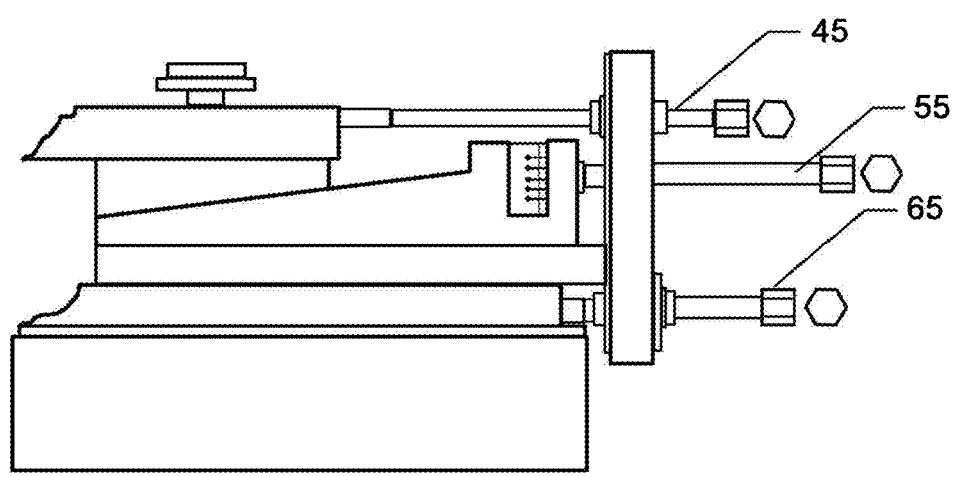
FIG. 23 is a side view of the shimless aligner in operational placement between the equipment foot and the equipment base, demonstrating the same structural arrangement as in FIG. 4, except that the screws are replaced with rods.

FIG. 23 is a side view of the shimless aligner employing rod mechanisms. This figure demonstrates the use of a side alignment rod 45, a vertical alignment rod 55, and a locking rod 65 respectively top to bottom.

A rod based alignment mechanism can be easily manipulated by other force generating mechanisms such as hydraulic, pneumatic, or rack and pinion mechanisms. Further, each of these manipulating mechanisms could be remotely operated by servo motors. In a best mode of the invention, the components will be made of hardened steel because of its strength, even when of narrow width, and because it is susceptible of welding. The dimensions will be in proportion to the equipment foot size and the overall pattern shown in the foregoing figures.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable oth-

What is claimed is:

1. A shimless aligner, for use with a foot connected to a base by means of a hold-down bolt, comprising:
a top plate, adjacently disposed below the foot, having a hole for receiving the hold-down bolt and having a slanted bottom surface;
a taper wedge, adjacently disposed below the top plate, having a slanted top surface slidably engaging the slanted bottom surface of the top plate, wherein the taper wedge has a longitudinal slot for slidably receiving the hold-down bolt;
a bottom plate, adjacently disposed below the taper wedge, having a hole for receiving the hold-down bolt; and
a back plate attached substantially perpendicularly at one end of the bottom plate, wherein said back plate has a lower portion that extends below the bottom plate and a threaded hole in that lower portion for a locking screw to engage the threaded hole and exert pressure against the base thereby preventing the bottom plate from rotating around the hold-down bolt;
wherein said back plate has a middle portion that extends above the bottom plate and a threaded hole in the middle portion for a vertical alignment screw to engage the threaded hole in the middle portion and engage a complimentary threaded hole in the side of the taper wedge thereby allowing the taper wedge to slide along the length of the slot when the vertical alignment screw is rotated and thereby also preventing rotation of the taper wedge around the hold-down bolt.

2. The shimless aligner as recited in claim 1, wherein:
the top plate further comprises a first and second stabilizer bars attached on opposite sides of the top plate and extending vertically downward from the top plate for slidably engaging the sides of the taper wedge and the bottom plate thereby increasing the rotational stability of the top plate because the top plate is prevented from rotating around the hold-down bolt.

3. The shimless aligner as recited in claim 1, wherein:
the taper wedge has a cut-out for engaging a graduated ring attached to the end of the vertical alignment screw, said graduated ring being circumferentially graduated for indicating the axial movement of said vertical alignment screw.

4. The shimless aligner as recited in claim 1, wherein:
said back plate has a top portion that extends above the bottom plate and beyond said middle portion and has a threaded hole in the top portion for a side alignment screw to engage the threaded hole in the top portion and for the tail end of the side alignment screw to press against the foot when the side alignment screw is sufficiently rotated through the threaded hole in the top portion thereby horizontally urging the foot away from the back plate to assist in effectuating side alignment.

5. The shimless aligner as recited in claim 2, wherein:
the taper wedge has a cut-out for engaging a graduated ring attached to the end of the vertical alignment screw, said graduated ring being circumferentially graduated for indicating the axial movement of said vertical alignment screw.

6. The shimless aligner as recited in claim 4, wherein:
the taper wedge has a cut-out for engaging a graduated ring attached to the end of the vertical alignment screw, said graduated ring being circumferentially graduated for indicating the axial movement of said vertical alignment screw.

7. The shimless aligner as recited in claim 4, wherein:
the top plate further comprises a first and second stabilizer bars attached on opposite sides of the top plate and extending vertically downward from the top plate for slidably engaging the sides of the taper wedge and the bottom plate thereby increasing the rotational stability of the top plate because the top plate is prevented from rotating around the hold-down bolt.

8. The shimless aligner as recited in claim 7, wherein:
the taper wedge has a cut-out for engaging a graduated ring attached to the end of the vertical alignment screw, said graduated ring being circumferentially graduated for indicating the axial movement of said vertical alignment screw.

9. A shimless aligner, for use with a foot connected to a base by means of a hold-down bolt, comprising:
a top plate, adjacently disposed below the foot, having a hole for receiving the hold-down bolt and having a slanted bottom surface;
a taper wedge, adjacently disposed below the top plate, having a slanted top surface slidably engaging the slanted bottom surface of the top plate, wherein the taper wedge has a longitudinal slot for slidably receiving the hold-down bolt;
a vertical alignment screw attached to the taper wedge and extending laterally;
a bottom plate, adjacently disposed below the taper wedge, having a hole for receiving the hold-down bolt; and
a back plate attached substantially perpendicularly at one end of the bottom plate,
wherein said back plate has a middle portion that extends above the bottom plate and a threaded hole in the middle portion for engaging the vertical alignment screw thereby allowing the taper wedge to slide along the length of the slot when the vertical alignment screw is rotated and thereby also helping to prevent rotation of the taper wedge around the hold-down bolt.

10. The shimless aligner as recited in claim 9, wherein:
the top plate further comprises a first and second stabilizer bars attached on opposite sides of the top plate and extending vertically downward from the top plate for slidably engaging the sides of the taper wedge and the bottom plate thereby increasing the rotational stability of the top plate because the top plate is prevented from rotating around the hold-down bolt.

11. The shimless aligner as recited in claim 9, wherein:
said back plate has a top portion that extends above the bottom plate and beyond said middle portion and has a hole in the top portion for a side alignment rod to slidably engage the hole in the top portion and for the tail end of the side alignment rod to press against the foot when the side alignment rod is sufficiently moved laterally through the threaded hole in the top portion thereby horizontally urging the foot away from the back plate to assist in effectuating side alignment.

12. The shimless aligner as recited in claim 11, wherein:
the top plate further comprises a first and second stabilizer bars attached on opposite sides of the top plate and extending vertically downward from the top plate for slidably engaging the sides of the taper wedge and the bottom plate thereby increasing the rotational stability of the top plate because the top plate is prevented from rotating around the hold-down bolt.

13. The shimless aligner as recited in claim 9, wherein:
said back plate has a lower portion that extends below the bottom plate and a hole in that lower portion for a locking rod to slidably engage the hole and exert pressure against the base thereby preventing the bottom plate from rotating around the hold-down bolt.

14. The shimless aligner as recited in claim 10, wherein:
said back plate has a lower portion that extends below the bottom plate and a hole in that lower portion for a locking rod to slidably engage the hole and exert pressure against the base thereby preventing the bottom plate from rotating around the hold-down bolt.

15. The shimless aligner as recited in claim 11, wherein:
said back plate has a lower portion that extends below the bottom plate and a hole in that lower portion for a locking rod to slidably engage the hole and exert pressure against the base thereby preventing the bottom plate from rotating around the hold-down bolt.

16. The shimless aligner as recited in claim 12, wherein:
said back plate has a lower portion that extends below the bottom plate and a hole in that lower portion for a locking rod to slidably engage the hole and exert pressure against the base thereby preventing the bottom plate from rotating around the hold-down bolt.

\* \* \* \* \*